(12) United States Patent
Shah

(10) Patent No.: US 7,606,240 B1
(45) Date of Patent: Oct. 20, 2009

(54) ETHERNET AUTOMATIC PROTECTION SWITCHING

(75) Inventor: Sunil P. Shah, San Jose, CA (US)

(73) Assignee: Extreme Networks, Santa Clara, CA (US)

( * ) Notice: Subject to any disclaimer, the term of this patent is extended or adjusted under 35 U.S.C. 154(b) by 753 days.

(21) Appl. No.: 11/155,526

(22) Filed: Jun. 16, 2005

(51) Int. Cl.
*H04L 12/28* (2006.01)

(52) U.S. Cl. ...................... 370/400; 370/401

(58) Field of Classification Search ........... None
See application file for complete search history.

(56) References Cited

U.S. PATENT DOCUMENTS

| | | | |
|---|---|---|---|
| 4,156,798 A | 5/1979 | Doelz | |
| 5,016,243 A | 5/1991 | Fite, Jr. | |
| 5,179,548 A | 1/1993 | Sandesara | |
| 5,495,472 A | 2/1996 | Ohara | |
| 5,751,696 A | 5/1998 | Bechtel et al. | |
| 5,923,643 A | 7/1999 | Higgins et al. | |
| 6,301,254 B1 | 10/2001 | Chan et al. | |
| 6,331,985 B1 | 12/2001 | Coden | |
| 6,373,826 B1 | 4/2002 | Russell et al. | |
| 6,526,020 B1 | 2/2003 | Ando | |
| 6,594,232 B1 | 7/2003 | Dupont | |
| 6,621,818 B1 | 9/2003 | Szczepanek et al. | |
| 6,674,727 B1 | 1/2004 | Carroll et al. | |
| 6,717,922 B2 | 4/2004 | Hsu et al. | |
| 6,766,482 B1 | 7/2004 | Yip et al. | |
| 2002/0067725 A1 | 6/2002 | Oguchi et al. | |
| 2002/0118636 A1* | 8/2002 | Phelps et al. | 370/222 |
| 2002/0143461 A1 | 10/2002 | Burns et al. | |
| 2002/0196735 A1 | 12/2002 | Hayes | |
| 2003/0165119 A1 | 9/2003 | Hsu et al. | |
| 2003/0225908 A1 | 12/2003 | Srinivasan et al. | |
| 2004/0081083 A1 | 4/2004 | Sekihata | |
| 2004/0081171 A1* | 4/2004 | Finn | 370/395.53 |
| 2004/0160904 A1 | 8/2004 | Enomoto et al. | |
| 2004/0179471 A1 | 9/2004 | Mekkittikul et al. | |
| 2004/0179518 A1* | 9/2004 | Bruckman et al. | 370/358 |
| 2004/0223503 A1 | 11/2004 | Lynch et al. | |

FOREIGN PATENT DOCUMENTS

| | | |
|---|---|---|
| EP | 0 973 301 A2 | 1/2000 |
| EP | 1 359 715 A1 | 11/2003 |

OTHER PUBLICATIONS

USPTO, "Advisory Action", *U.S. Appl. No. 10/796,854*, mailed Mar. 3, 2008, 1-3.

(Continued)

*Primary Examiner*—Raj Jain
(74) *Attorney, Agent, or Firm*—Blakely, Sokoloff, Taylor & Zafman, LLP

(57) ABSTRACT

Preventing a loop in a virtual network that spans at least two rings when there is a failure in two or more segments shared between the rings. A node connected to one of the shared segments is designated as the root blocker node and prevents transmitting data traffic between the node and all the ports connected thereto that have not failed except for one, in response to detecting the failure. For one embodiment the root blocker node periodically transmits a path detect signal to validate its blocking status.

25 Claims, 12 Drawing Sheets

OTHER PUBLICATIONS

USPTO, "Advisory Action", *U.S. Appl. No. 10/796,854*, mailed Mar. 21, 2008, 1-3.

USPTO, "Final Office Action", *U.S. Appl. No. 10/796,854*, mailed Dec. 27, 2007, 1-7.

USPTO, "Office Action", *U.S. Appl. No. 10/796,854*, mailed Jul. 30, 2008, 1-10.

Belitsos, B., "Spans bridge network gaps. (Connectively) (Column)", Computer Decisions, vol. 20, No. 5, pp. 26(2), May 1998.

Cope, P., "New LAN bridges adapt to changing user needs", Network World, vol. 9, No. 19, pp. 46, 52, May 11, 1992.

Duffy, J., "Emerging Standard to Speed Up Ethernet Econfigs"; Network World, vol. 16, No. 44, p. 8, Nov. 1, 1999.

Hunter, P., "Taking the 10 Gigabit Ethernet road (Technology Information)", Computer Weekly, vol. 28, Jul. 19, 2001.

Shah, Sunil P., U.S. Appl. No. 10/796,854; *Office Action* mailed Sep. 10, 2007; 8 pages.

Final Office Action from U.S. Appl. No. 10/796,854 mailed May 17, 2007; 10 pages.

Office Action from EP Application No. 05 290 263.2—2416 mailed Mar. 1, 2007, 5 pgs.

Non-Final Office Action for U.S. Appl. No. 10/796,854, mailed Dec. 15, 2008, Whole document.

* cited by examiner

ETHERNET AUTOMATIC PROTECTION SWITCHING

CLAIM OF PRIORITY

This application is related to, and hereby claims the benefit of Utility application Ser. No. 10/796,854, which was filed Mar. 8, 2004.

TECHNICAL FIELD

The present invention relates to the field of network communications. In particular, the present invention relates to a system of automatic protection switching in a multiple ring-based bridged network, in which the rings share a segment.

BACKGROUND

Most of today's metropolitan area network (MAN) infrastructure is based on the Synchronous Optical NETwork (SONET) adopted by the American National Standards Institute (ANSI) as a standard for fiber optic networks. SONET uses one optical fiber to transmit all data traffic and maintains a second optical fiber on standby. Should the working optical fiber fail, SONET automatically detects the failure and moves the data traffic to the standby optical fiber.

An alternative to using SONET as the provisioning platform for networking service is to use a bridged network like the Ethernet. A problem with bus and ring networks like the Ethernet is the possibility of a single point of failure in the network. A common solution is to design the network with redundant segments and loops so that there is more than one route between nodes in the network. Redundancy and loops can, however, present another problem in which transmission of a broadcast packet or an unknown unicast packet results in a broadcast storm where each node receives and rebroadcasts the packet causing potentially severe network congestion.

One way known in the industry of preventing broadcast storms and other unwanted side effects of looping is to use the Spanning Tree Protocol (STP), based on a spanning tree algorithm that has been standardized in the 802.1D specification by the Institute of Electrical and Electronic Engineers (IEEE Std. 802.1D-1998, IEEE Standard for Information technology—Telecommunications and information exchange between systems—Local and metropolitan area networks—Common specifications). With the STP, bridges or switches in the network dynamically calculate an optimum subset of the network topology that is loop-free yet allows a single, primary, path to each node in the network. Alternate paths are blocked but can be unblocked as necessary to keep communication open when a fault occurs in a primary path selected by the STP. A significant problem with the STP is that when a link breaks, it may take a significant period of time, e.g., thirty or more seconds, for an alternate path around the problem to be calculated and traffic successfully rerouted. This level of performance is too slow for use in today's local area networks (LANs) and metropolitan area networks (MANs).

An alternative to using Ethernet with STP is described in U.S. pending patent application Ser. No. 09/999,796, filed on Oct. 31, 2001, entitled Ethernet Automatic Protection Switching, and assigned to the assignee of this invention. The pending patent application discloses a method in which an Ethernet automatic protection switching (EAPS) system prevents loops in a layer-2 network having a ring topology.

The EAPS system provides for one or more EAPS domain on a single Ethernet ring. An EAPS domain is configured on the physical ring. Nodes, such as bridges, switches, other packet-forwarding devices, network server computers, end stations, or host computers, are connected to the ring. For each EAPS domain, there is designated a master node. All other nodes on the ring are designated transit nodes. The master node may be configured at the time of network installation and set-up. On the master node, one port is designated as the primary port, and another port is designated as a secondary port. In normal operation, the master node blocks the secondary port from transmitting or receiving data traffic to prevent a loop in the ring. This makes it possible to deploy and use standard Ethernet switching and learning algorithms on the ring network topology. If the master node detects a ring fault, it unblocks its secondary port and allows frames of Ethernet data traffic to pass through the secondary port.

At least one virtual network, such as a virtual local area network (VLAN), that is to be protected by the EAPS domain, is configured on the ring as well. In particular, the virtual network is configured on each port of each node connected to the ring. The virtual network includes a control virtual network, for example, a control virtual local area network (VLAN), and at least one data virtual network, for example, a data VLAN. Control messages are transmitted over the control VLAN and pass through all ports of all nodes, including the secondary port of the master node.

The master node detects a network failure by means of these control messages sent between the master node and the transit nodes using the control VLAN. As stated above, during normal operation, the master node blocks the data traffic on the data VLAN from traversing its secondary port. However, during a network failure, the master node reroutes the data traffic on the data VLAN through its secondary port. When the network is restored and again capable of normal operation, the EAPS system prevents data traffic looping through the network by blocking the data traffic on the data VLAN until the master node notifies the transit nodes that the normal operation has resumed and blocks its secondary port.

A problem can occur when a single virtual network spans multiple rings. Each ring is associated with a separate EAPS domain, and may be connected together via a segment of its ring that is shared with the other ring, such as link 3 in FIG. 1. A segment may comprise one or more links and nodes between two nodes. When there is a failure in a shared segment, the master node in each respective ring unblocks its secondary port, thereby creating a loop that spans both rings in the virtual network. One approach to addressing this problem is to employ the spanning tree protocol (STP) to block a segment and thereby stop data traffic looping through the multi-ring network, but configuring both STP and EAPS complicates both configuring and managing the network. Additionally, the STP is slow to converge to a new network topology in the event of a network failure, compared to EAPS.

SUMMARY OF THE INVENTION

The invention prevents a loop in a virtual network that spans at least two rings when there is a failure in a segment shared between the rings, using an automatic protection switching algorithm. A node connected to the shared segment and the rings detects a failure in the segment to transmit data traffic; and prevents transmitting data traffic between the node and all but one of the rings, in response to detecting the failure.

BRIEF DESCRIPTION OF THE DRAWINGS

The present invention is illustrated by way of example, and not necessarily by way of limitation, in the figures of the accompanying drawings in which like reference numerals refer to similar elements, and in which.

DETAILED DESCRIPTION OF THE INVENTION

Figure 1:
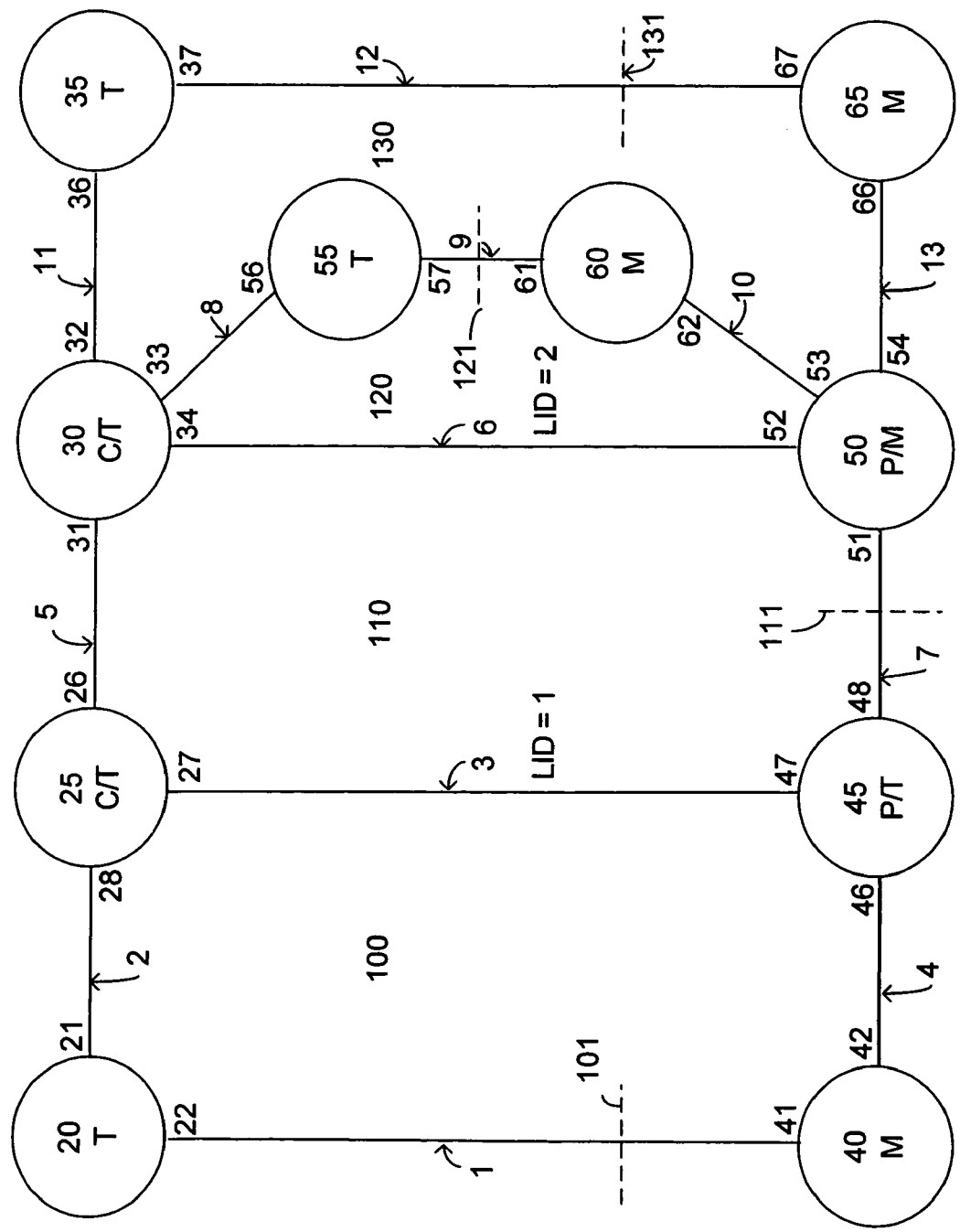
FIG. 1 illustrates a network in which an embodiment of the invention may be used.

FIG. 1 illustrates a multiple ring topology for an Ethernet network. Ethernet Automatic Protection Switching (EAPS) is deployed in the network to prevent data traffic from looping through the network, and to provide the ability to continue transmitting data traffic to all nodes in the network in the event of a failure of a particular segment in the network, as briefly described above in the background and as will be more fully described below.

In FIG. 1, a physical ring is formed by the connection of nodes 20 and 25 via link 2, the connection of nodes 25 and 45 via link 3, the connection of nodes 45 and 40 via link 4, and the connection of nodes 40 and 20 via link 1. The ring is protected by an Ethernet Automatic Protection Switching (EAPS) system. Thus, in the event there is a failure in a segment in the ring, for example, as happens when a port of one of the nodes connected to the ring fails, or a segment is physically breached, the EAPS system detects the failure in the segment and redirects data traffic to the extent possible so that each node in the ring may still transmit data traffic to the other nodes in the ring.

In particular, the ring formed by nodes 20, 25, 40 and 45, and network segments 1, 2, 3, and 4, is associated with an EAPS domain 100. An EAPS domain is configured on the physical ring. A user may configure one of the nodes of the EAPS domain to be a master node. This node is then designated the master node, while the other nodes are designated as transit nodes. In the EAPS domain 100, node 40 is designated a master node, M, while the other nodes 20, 25 and 45, are designated transit nodes, T. One or more virtual networks, such as Virtual Local Area Networks (VLANs), that are to be protected by the EAPS system may be configured on each port of the nodes in EAPS domain 100. A control VLAN may run through all the nodes in the EAPS domain that carry EAPS control packets. One or more data VLANs may be added to all the nodes of the EAPS domain to get the protection of the EAPS system. There may be more than one EAPS domain on a ring. Each EAPS domain on the ring has its own control VLAN and data VLANs. There is a one-to-one mapping between an EAPS domain and a control VLAN.

Each node on the ring in EAPS domain 100 has two ports connected to the ring. For example, node 20 is connected to segment 2 of the ring by port 21, and segment 1 of the ring by port 22. Likewise, node 25 is connected to segment 2 and 3 by ports 28 and 27, respectively, master node 40 is connected to segments 1 and 4 by ports 41 and 42, respectively, and node 45 is connected to segments 4 and 3 by ports 46 and 47, respectively.

A user may configure one of the two ports as a secondary port based on which segment the user wants blocked during normal operation. For example, port 42 of master node 40 is configured as a primary port, and port 41 is configured as a secondary port. In normal operation, master node 40 blocks the secondary port for all non-control Ethernet frames, that is, all Ethernet frames containing data traffic, thereby preventing a loop in the ring, and allowing the use of existing, standard Ethernet bridging, switching, and learning algorithms on the ring. In particular, master node 40 blocks data traffic associated with any data VLAN configured on secondary port 41. (Any other references herein to blocking a port should be understood as blocking data traffic for a data VLAN configured on such port, while at the same time not blocking any control traffic for a control VLAN configured on the same port).

In FIG. 1, the dotted line 101 indicates that by virtue of blocking the secondary port 41 of master node 40, segment 1 is blocked from transmitting or receiving data traffic between nodes 20 and 40. As a result, only a single path exists between nodes 20, 25, 40 and 45, defined by segments 2, 3 and 4, as required by standard transparent bridging and learning algorithms to prevent unwanted transmission of certain unicast and broadcast data traffic.

If master node 40 detects a fault in the ring formed by segments 1, 2, 3 and 4, it unblocks its secondary port 41 and allows Ethernet data traffic to pass through that port. For example, if there is a failure in segment 4, master node 40 unblocks port 41, thereby maintaining connectivity between the nodes 40, 20, 25, and 45 via a single path defined by segments 1, 2, and 3.

The EAPS system provides for a control virtual network, such as a control VLAN, in EAPS domain 100. Control messages are exchanged between master node 40 and transit nodes 20, 25 and 45 using the control VLAN. These control messages pass through all ports of the nodes in the EAPS domain, including secondary port 41 of master node 40.

If any transit node in EAPS domain 100, for example, transit node 20, detects a segment directly connected to one of its ports is no longer working, or down, such as segment 2 connected to port 21, the transit node sends a control message over the control VLAN to master node 40 indicating the segment is down. Master node 40 receives the control message indicating the segment is down, thereby detecting a fault has occurred on the ring associated with EAPS domain 100, and unblocks its secondary port 41 to data traffic. Master node 40 then flushes its bridging tables, and sends a control message over the control VLAN to the transit nodes in EAPS domain 100 instructing them to do the same, since the topology of the ring has changed. Immediately after flushing their bridging tables, master node 40 and transit nodes 20, 25 and 45 begin learning the new ring topology according to learning algorithms used in standard bridging techniques.

In addition to master node 40 being alerted to a ring fault by a transit node in the same EAPS domain, master node 40 may also poll the condition of the ring by sending a control message out its primary port 42 to the control VLAN on a periodic basis, for example, in accordance with a user-configurable time interval, to check the status of the ring. If the ring is complete, the control message will be received on its secondary port 41, and master node 40 continues normal operation.

If, on the other hand, the control message is not received after a certain period of time, master node 40 considers the ring to have a fault and unblocks its secondary port 41 to data traffic, flushes its bridging table, and sends a control message over the control VLAN to the transit nodes in EAPS domain 100 instructing them to do the same, since the topology of the ring has changed. Immediately after flushing their bridging tables, master node 40 and transit nodes 20, 25 and 45 begin learning the new ring topology according to learning algorithms used in standard bridging techniques. This ring polling technique provides a backup in the event the control message sent from a transit node alerting master node 40 that a segment is down gets lost or is otherwise not detected by master node 40.

Master node 40 continues to periodically send out primary port 42 a control message over the control VLAN checking status of the ring even when it has detected a fault exists in the ring. In so doing, master node 40 detects when the ring is restored by virtue of receiving the control message on its secondary port 41 upon the message's complete transmission around the ring. When master node 40 detects the ring is complete, it blocks data traffic on its secondary port, flushes its bridging table, and sends a control message over the control VLAN to transit nodes 20, 25 and 45 to do the same, since the topology of the ring has changed. Immediately after flushing their bridging tables, master node 40 and transit nodes 20, 25 and 45 begin learning the new ring topology according to learning algorithms used in standard bridging techniques.

There may be a period of time between a transit node such as transit node 20 detecting that a directly connected segment such as segment 2 is restored to operation, and master node 40 receiving at its secondary port 41 its control message previously sent over the control VLAN to check the status of the ring. During this period of time, the secondary port 41 of master node 40 remains unblocked. This scenario presents the possibility of a temporary loop in the ring.

To prevent the possibility of a temporary loop in a ring, a transit node, upon detecting a directly connected segment is restored to operation, transitions any data VLAN associated with the port directly connecting the transit node to the restored segment to a temporary blocked state. Additionally, the node transitions to a preforwarding state, in which it temporarily suspends forwarding any data traffic. When a transit node in the preforwarding state receives the control message from master node 40 instructing it to flush its bridging table, the transit node flushes its bridging table, unblocks any blocked data VLANs on the newly restored port, and transitions to normal state of operation.

FIG. 1 illustrates three rings in addition to the ring in EAPS domain 100 formed by nodes 20, 25, 40 and 45 and their corresponding interconnected segments. For example, a second ring that has its own EAPS domain 110 is formed by nodes 25, 30, 45 and 50, and corresponding segments 3, 5, 6 and 7. Node 50 is the master node for EAPS domain 110, and nodes 25, 30, and 45 are transit nodes in the domain. A third ring in a third EAPS domain 120 consists of transit nodes 30, 50, 55 and master node 60 interconnected by segments 6, 8, 9, and 10. Finally, a fourth ring formed by nodes 30, 35, 50 and 65 and segments 6, 11, 12 and 13 is configured in a separate EAPS domain 130, with node 65 as the master node and the other three nodes (i.e., nodes 30, 35, and 50) as transit nodes.

The operation of the rings in EAPS domains 110, 120 and 130, and the operation of the EAPS system in each EAPS domain, is identical to the operation of the ring and EAPS system in EAPS domain 100, as described above. In EAPS domain 110, master node 50 blocks it secondary port 51 to data traffic in normal operation, effectively blocking segment 7, as denoted by dashed line 111 in FIG. 1. In EAPS domain 120, master node 60 blocks secondary port 61, which prevents data traffic being transmitted over segment 9, denoted by dashed line 121. Finally, in EAPS domain 130, master node 65 blocks secondary port 67, which blocks segment 12 to data traffic as indicated by dashed line 131

Even though the multiple ring topology illustrated in FIG. 1 has redundant connections between nodes, the EAPS system deployed in each EAPS domain provides for only a single path between any two nodes in the network by blocking a secondary port of a master node in each EAPS domain.

A ring can be configured with multiple EAPS domains, each with its own master node, whether the same or a different node, and each with its own one or more data VLANs to protect, to facilitate spatial reuse of the ring. In addition, a node can belong to more than one ring, and hence, to more than one EAPS domain. For example, nodes 25 and 45 are members of the ring in EAPS domain 100 as well as members of the ring in EAPS domain 110. Likewise, nodes 30 and 50 are members of three rings: the ring formed by the nodes and interconnected segments in EAPS domain 110, the ring in EAPS domain 120 and the ring in EAPS domain 130.

In one embodiment, each EAPS domain to which a node belongs requires the node run a separate instance of an EAPS protocol, one instance per EAPS domain. Thus, for example, in FIG. 1, nodes 20, 35, 40, 55, 60 and 65 run one instance of the EAPS protocol, whereas nodes 25 and 45 run two instances for EAPS domains 100 and 110, and nodes 30 and 50 run three instances for EAPS domains 110, 120 and 130.

As mentioned above, each ring is associated with a single EAPS domain, and a single EAPS domain can support one or more data VLANs. However, a single VLAN may also span multiple EAPS domains. For example, if end user nodes connected to different rings are to be provided the ability to communicate with each other, a VLAN must encompass both rings, and any intermediate or interconnecting rings, to which the end user nodes are connected.

When multiple rings are interconnected, neighboring rings share a segment. For example, each ring illustrated in FIG. 1 shares at least one segment in common with another ring. Segment 3, for example, is shared by the ring formed of nodes 20, 25, 40 and 45 in EAPS domain 100, as well as the ring formed of nodes 25, 30, 45 and 50 in EAPS domain 110. Likewise, segment 6 is shared between the rings in EAPS domains 110, 120 and 130.

In FIG. 1, an inter-EAPS domain loop can form in a data VLAN spanning multiple EAPS domains. For example, given a data VLAN that spans the entire network topology illustrated in the figure, a loop can form in the data VLAN if there is a failure in a segment shared between rings (and multiple EAPS domains).

Figure 2:
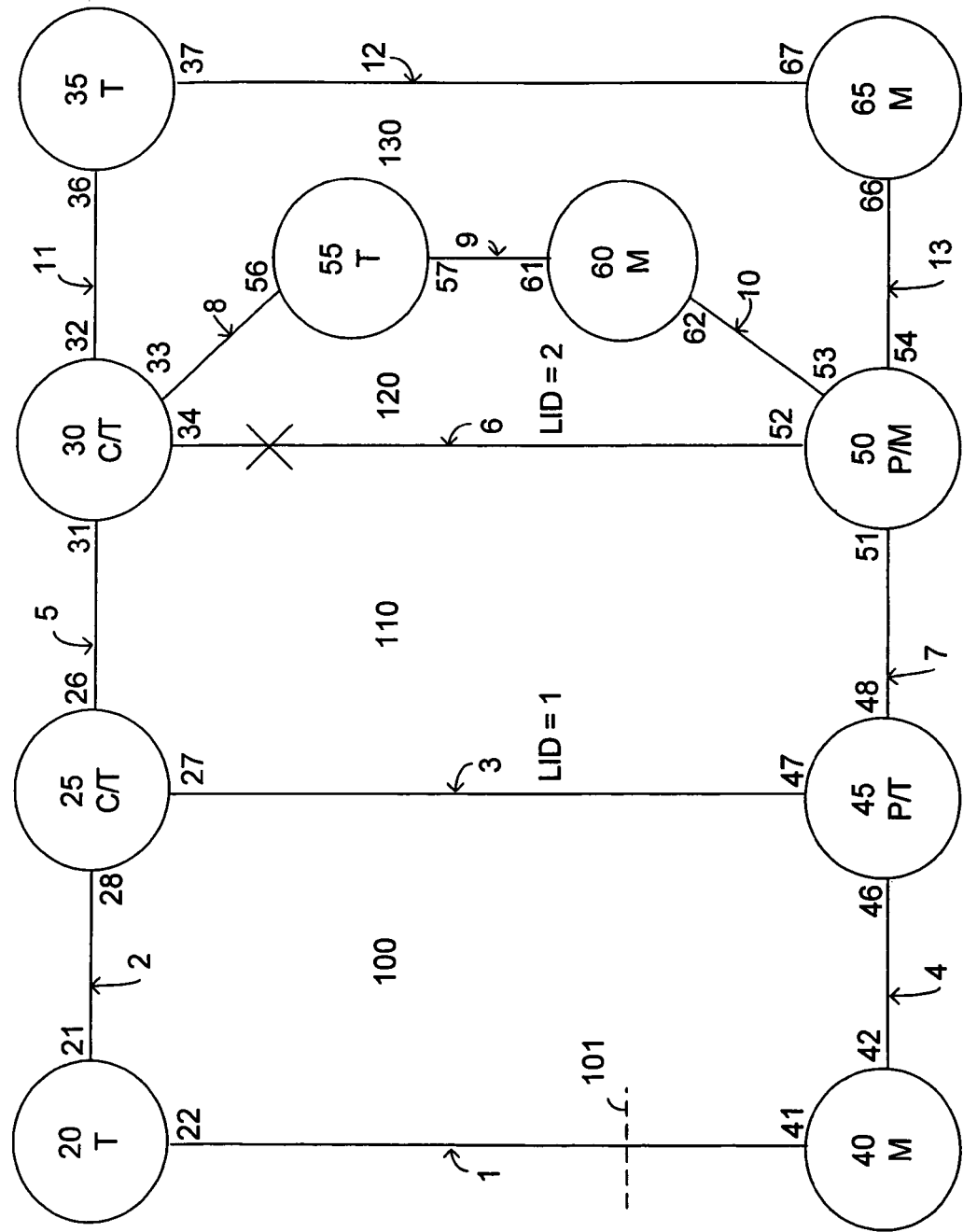
FIG. 2 illustrates a loop in the network that the invention addresses.

To demonstrate this, it is first worth noting the segments in FIG. 1 that are illustrated as transmitting data traffic over a data VLAN spanning the entire network versus those that are blocked by respective master nodes in each EAPS domain, and then consider with reference to FIG. 2 what happens to the network topology in the event of a failure of a shared segment.

In FIG. 1, a single path exists between all nodes in the network by virtue of their interconnection via unblocked segments 2, 3, 4, 5, 6, 8, 10, 11 and 13. Segments 1, 7, 9 and 12 essentially are blocked by master nodes 40, 50, 60 and 65 by virtue of the master nodes blocking their respective secondary ports 41, 51, 61 and 67 directly connected to segments 1, 7, 9 and 12.

If there is a failure in shared segment 6 (denoted by the "X" overlaying segment 6 in FIG. 2), for example, because port 34 on node 30 or port 52 on node 50 fail, or due to a failure of the segment itself, such as can occur if a fiber optic cable is cut, master node 50, in accordance with the EAPS system described herein, unblocks its secondary port 51 so that the nodes in EAPS domain 110 can still communicate with each other using segment 7. FIG. 2 denotes segment 7 is unblocked by the absence of the dashed line 111 present in FIG. 1. Likewise, master node 60 unblocks secondary port 61 in EAPS domain 120 so segment 9 carries data traffic (note dashed line 121 in FIG. 1 is missing in FIG. 2), and master node 65 in EAPS domain 130 unblocks its secondary port 67 so data traffic can be rerouted over segment 12 (as noted by the absence of dashed line 131 in FIG. 2).

As a result, a loop in the data VLAN is formed by the interconnection of unblocked segments 3, 5, 8, 9, 10, and 7. Additionally, a second loop in the data VLAN is formed by the interconnection of unblocked segments 3, 5, 11, 12, 13 and 7. A third loop in the data VLAN is formed by the interconnection of unblocked segments 8, 11, 12, 13, 10 and 9. (In contrast, a loop does not form in that portion of the data VLAN comprising EAPS domains 100 and 110, because the segment shared by the rings in those EAPS domains, that is, segment 3, did not fail). As noted earlier, redundancy and loops present another problem in which a broadcast packet or an unknown unicast packet results in a broadcast storm where each node receives and rebroadcasts the packet causing potentially severe network congestion.

Figure 3:
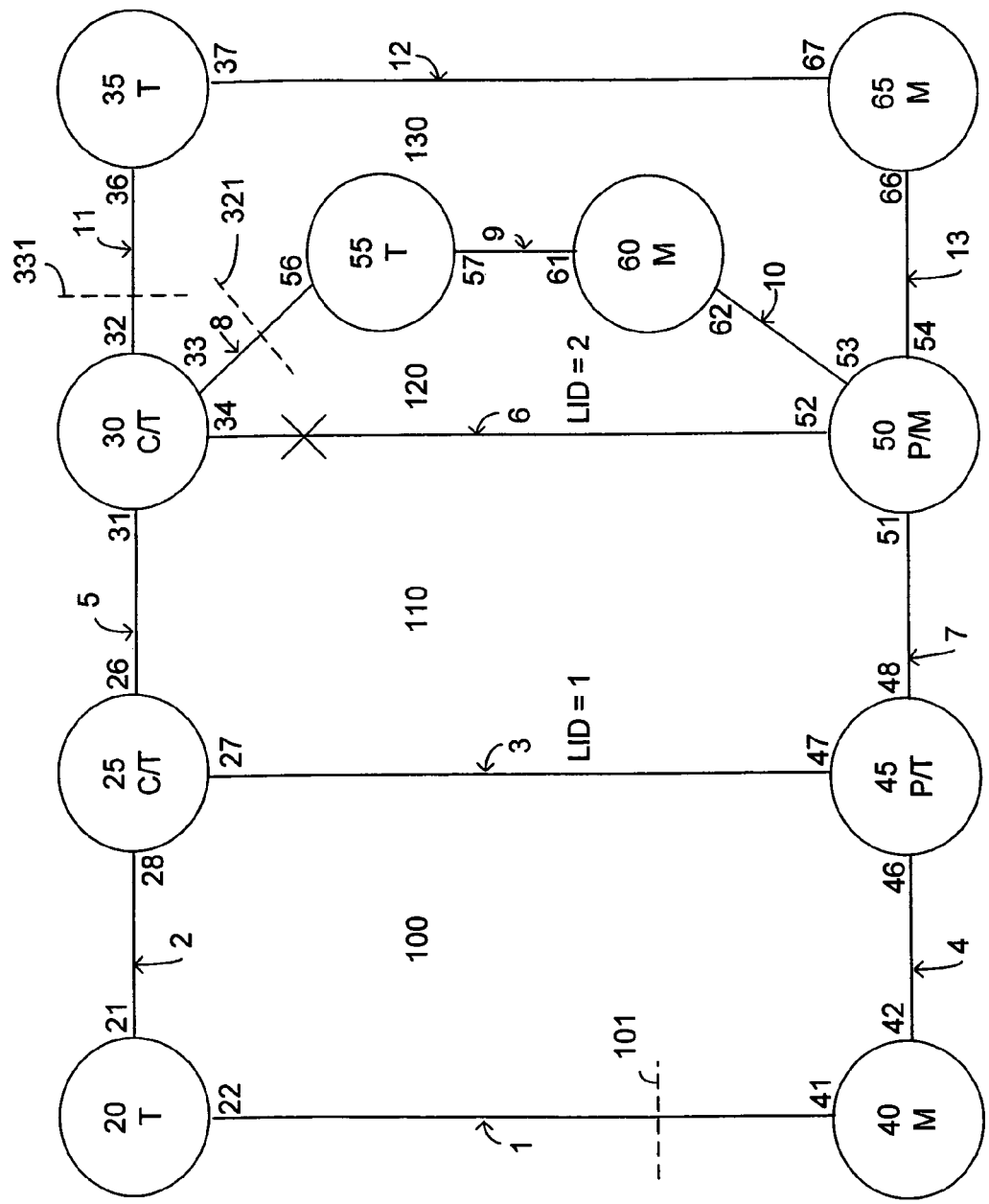
FIG. 3 illustrates an embodiment of the invention.

With reference to FIG. 3, an embodiment of the invention is described which resolves the unwanted loops in the data VLAN spanning the multiple rings as a result of failure of segment 6 shared by the rings in EAPS domains 110, 120 and 130. One node directly connected to one end of the shared segment is configured as a controller node, while the other node directly connected to the other end of the shared segment is configured as a partner node. The controller node is responsible for transitioning ports to a blocking state when there is a failure in the shared segment. The shared segment may be configured with a link identifier (ID), which uniquely identifies the link in the network. Each endpoint node of the shared segment is configured with the link ID that uniquely identifies that shared segment. In FIG. 3, node 30 which is directly connected to one end of shared segment 6 is configured as the controller node, and node 50 which is directly connected to the other end of shared segment 6 is configured as the partner node. It should be noted that such designations are made without regard to whether the nodes are also configured as a transit node or a master node in the EAPS domains to which they belong.

The controller node and partner nodes, by virtue of being directly connected to a shared segment, perform functions in addition to those described above for transit nodes and master nodes. The controller node sends periodic control messages to its partner node over the control VLAN for each EAPS domain to check the status of both segments and shared segments. The partner node does the same, sending periodic control messages to its corresponding controller node for each EAPS domain via the shared segment to check status of the segment. If the controller node receives the control messages that check status from the partner node on a particular EAPS domain, the controller node determines from such receipt that the segment to the partner on that EAPS domain is operating. Likewise, the partner node determines the segment to the controller node for each EAPS domain is operating if it receives the control messages that check status of the segment. In addition to using the control messages to check status of the segment, the messages may also contain other information such as the state of the sending node, whether partner node or controller node, etc.

In the case of segment 6, since the segment is shared among three EAPS domains 110, 120 and 130, transit node 30, designated a controller node for the shared segment, periodically sends control messages on each EAPS domain to partner node 50. Partner node 50 likewise periodically sends control messages to controller node 30 for each EAPS domain. The period of time between sending the control messages can be configurable, and set to one second. So long as the partner node and controller node are successfully exchanging these control messages on the shared segment on a periodic basis for each EAPS domain to which they belong, the nodes are considered to be in a ready state and operating normally. If, however, a control message is not received at the controller node 30 via the shared segment in a configurable period of time, say, three seconds, a timer expires indicating to the controller node that the shared segment is down.

Alternatively, two other situations may provide notice that a shared segment is down. A hardware interrupt provides immediate notice of a failure in a shared segment. Also, a node may receive a link down message from another node on that segment.

When the controller node detects the shared segment is down, it transitions all but one of its other ports connected to operating segments to a blocking state. For example, controller node 30 blocks port 33, thereby effectively blocking segment 8 from transmitting data traffic (as denoted by dashed line 321 in FIG. 3), and blocks port 32, preventing segment 11 from transmitting data traffic (as denoted by dashed line 331 in FIG. 3). As a result, the two loops that would otherwise be formed in a data VLAN spanning EAPS domains 110, 120 and 130 when there is a failure in shared segment 120 are prevented. Indeed, such loops are prevented for each VLAN that may span multiple EAPS domains. Port 31 of controller node 30, on the other hand, is kept in an active open state and actively exchanges frames or packets of data over the data VLAN or VLANs, as the case may be, with other nodes in the network. As illustrated in FIG. 3, a single path between any two nodes in the network is maintained.

It should be noted that while in the example provided above ports 32 and 33 were blocked, and port 31 of controller node 30 kept in an active open state, the same result would be achieved by blocking any combination of all but one of the three ports 31-33 and keeping the remaining port in an active open state. A different network topology would be produced, with either segment 11 or 8 unblocked and the other segment blocked along with segment 5, but a single path between any two nodes in the network would still be maintained.

When the shared segment recovers and is back up again, the controller node changes state from blocking to preforwarding, in which it temporarily suspends forwarding any data traffic until the master nodes on all segments block appropriate ports to prevent loops. Then, the controller node transitions to a normal state of operation.

It should be appreciated that the example of an embodiment of the invention is provided with reference to FIG. 3 is not limited to a physical shared segment. Rather, while a shared segment such as segment 6 may be a fiber cable, the shared segment may also be a series of segments interconnected by nodes (not shown) intermediate to nodes 30 and 50.

Figure 4:
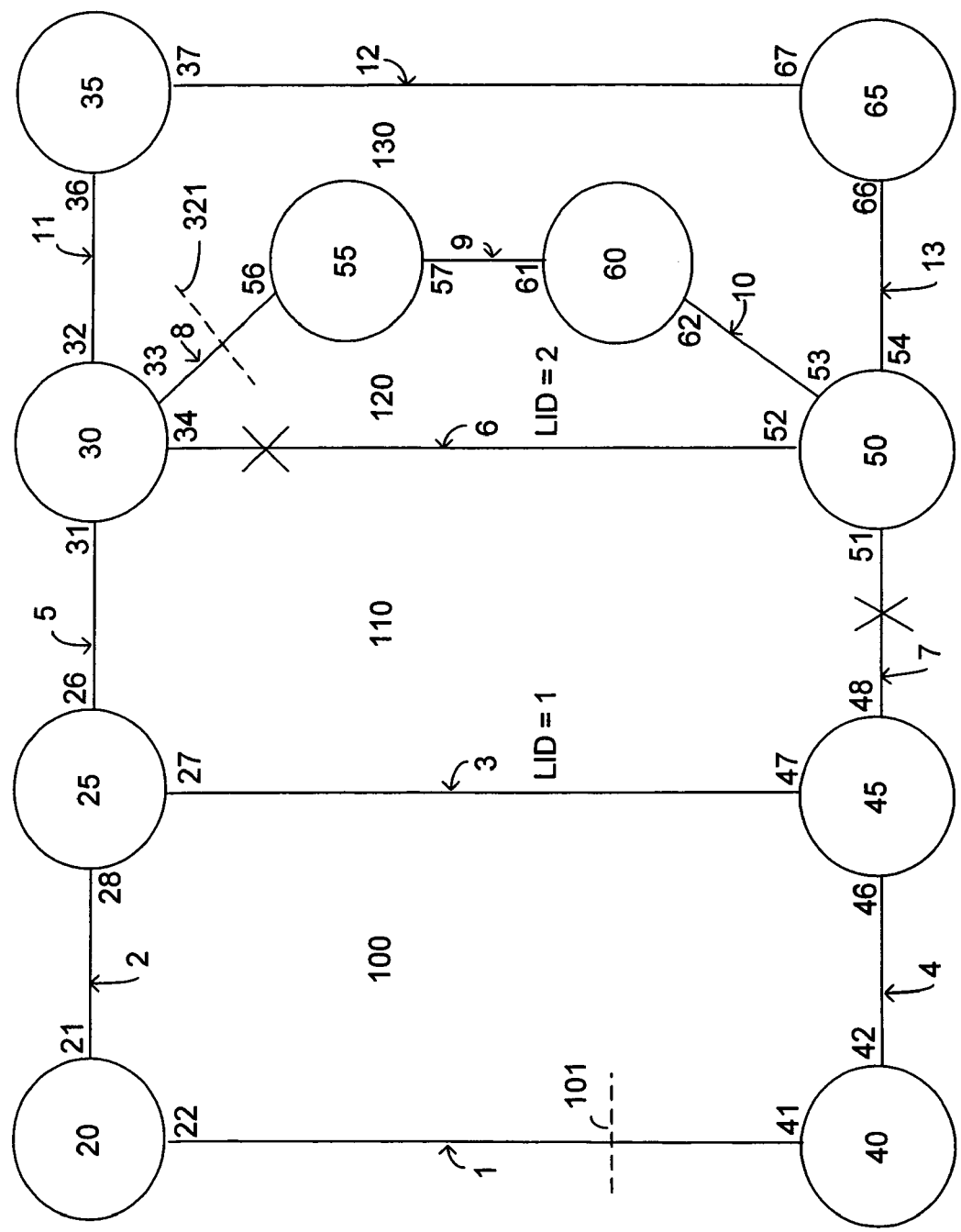
FIG. 4 illustrates a loop in the network that the invention addresses.

FIG. 4 illustrates the situation where there are failures in multiple segments of the network. In FIG. 4, there is a failure to transmit data traffic in shared segment 6 and segment 7. This causes node 30 to put port 31 into a forwarding, or open, state. Node 30 unblocks port 32 to maintain connectivity, thereby putting port 32 into an active open state.

Figure 5:
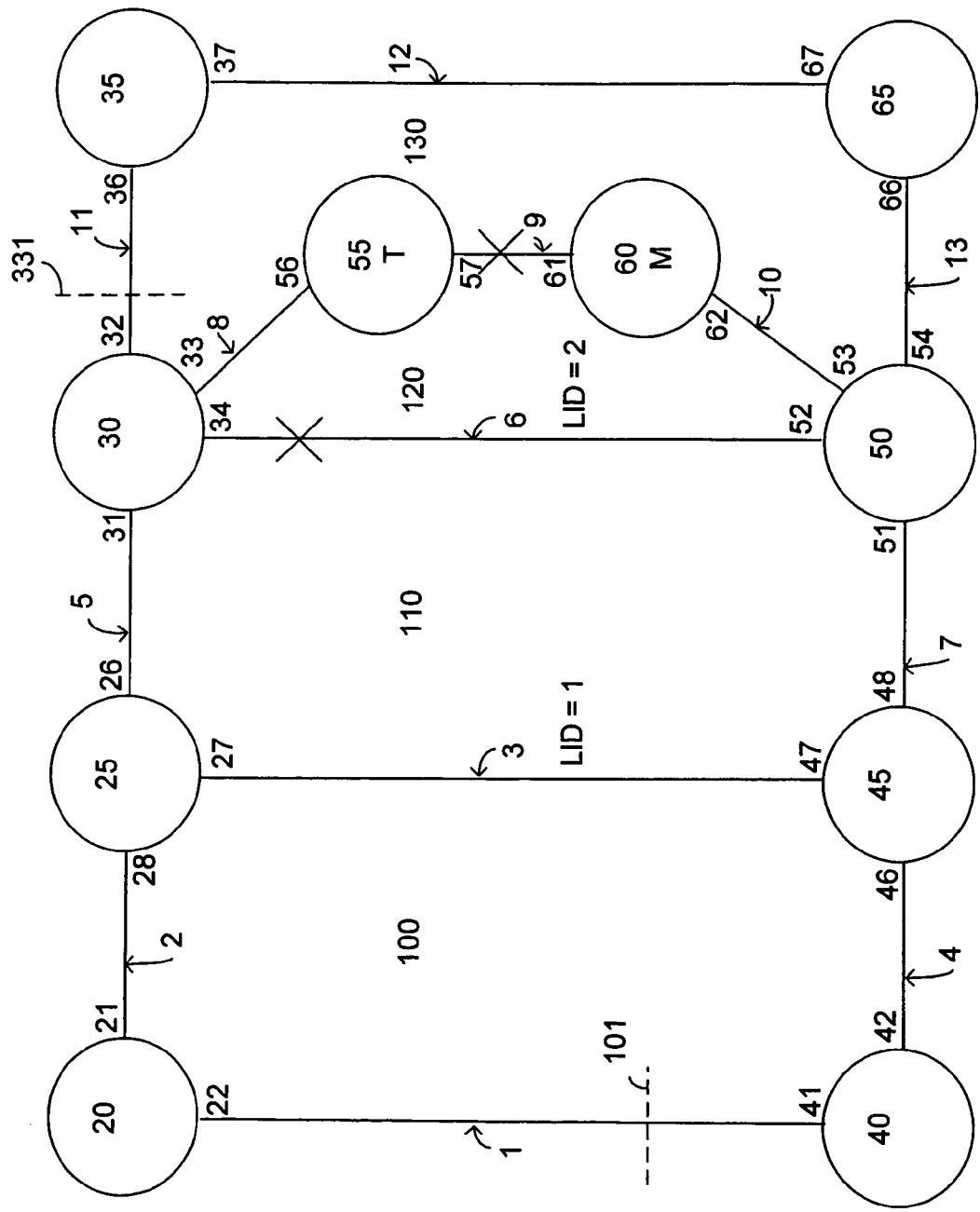
FIG. 5 illustrates an embodiment of the invention.

FIG. 5 illustrates the situation where there are failures in multiple segments in the network. In FIG. 5, there is a failure to transmit data traffic in shared segment 6 and segment 9. This causes node 30 to put port 31 into a forwarding, or active open, state. Node 30 unblocks port 33 to maintain connectivity, thereby putting port 33 into an open state.

Figure 6:
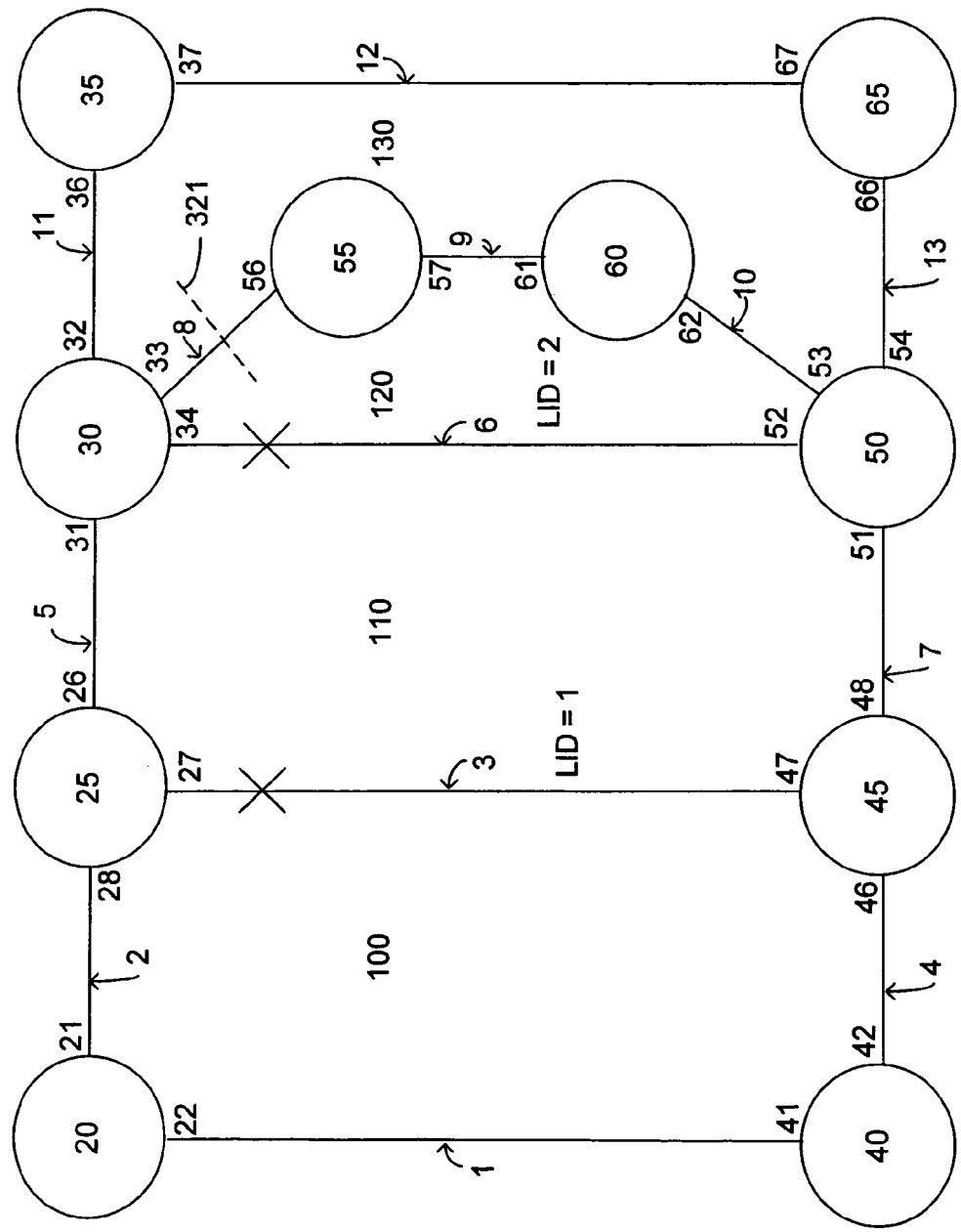
FIG. 6 illustrates an embodiment of the invention.

FIG. 6 illustrates the situation where there are failures in multiple shared segments in the network. In FIG. 6, there is a failure to transmit data traffic in shared segments 6 and 3. This causes master node 40 to unblock secondary port 41, so segment 1 carries data traffic. Node 30 puts port 31 into a forwarding, or open, state and unblocks port 32, putting it into active open state to maintain connectivity. Port 33 remains blocked. Node 25 keeps port 26 in forwarding, or open, state, and port 28 in forwarding, or active open, state, as described above with respect to FIG. 4. As a result, a loop in the data VLAN is formed by the interconnection of unblocked segments 1, 2, 5, 11, 12, 13, 7, and 4.

Figure 7:
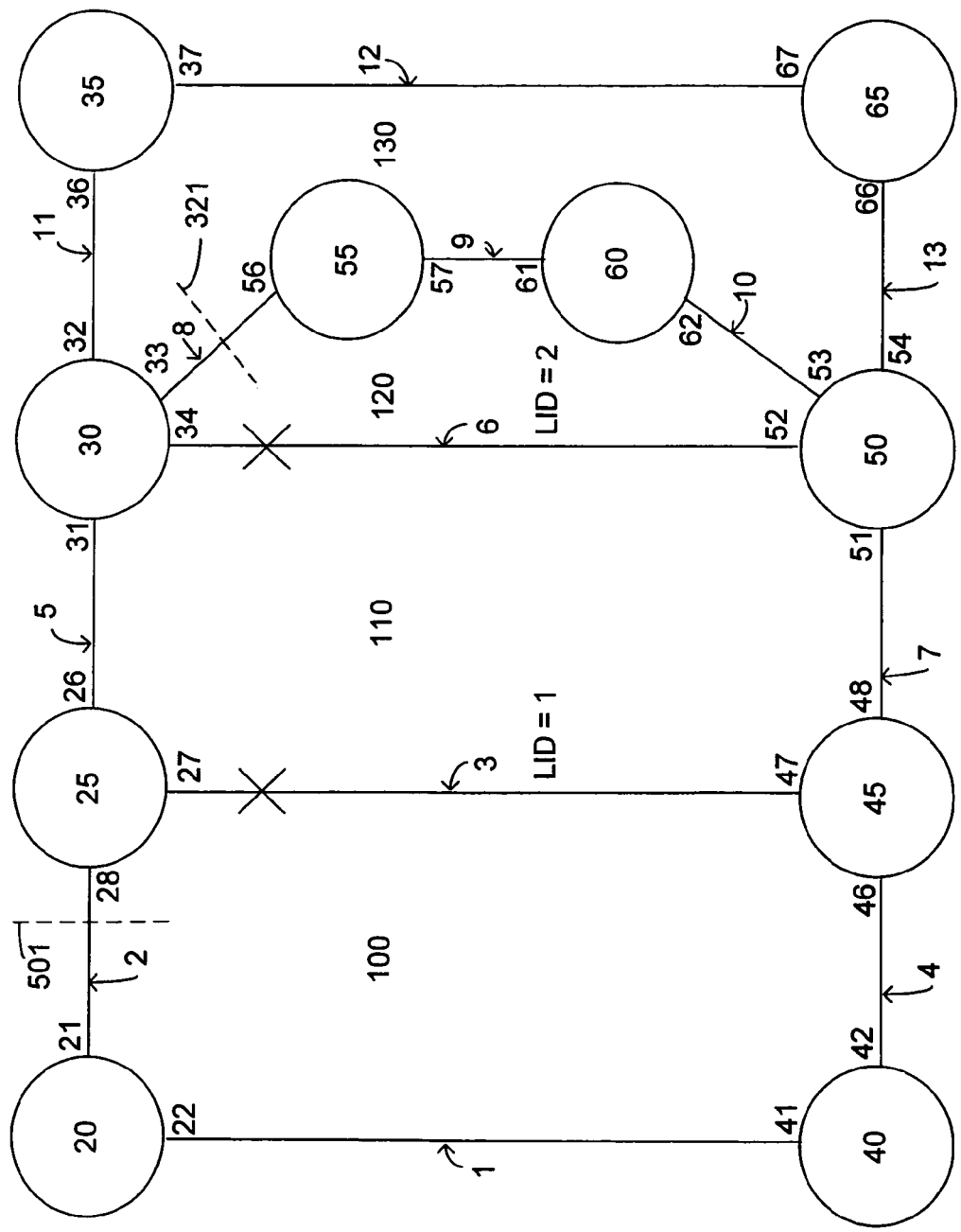
FIG. 7 illustrates an embodiment of the invention.

To prevent this loop, one controller node in the network is designated the root blocker. A root blocker may be determined dynamically among the multiple controller nodes in a blocking state by exchanging information, such as link IDs. Various criteria may be used in designating the root blocker, such as designating the controller node with the lowest link ID as the root blocker. FIG. 7 illustrates an embodiment of the invention that implements a root blocker in the network. In FIG. 7, both links 3 and 6 are down. Since controller node 25 has a lower link ID (ID of 1) than controller node 30 (ID of 2), controller node 25 is designated the root blocker. The root blocker keeps one port in forwarding state and blocks all other ports whose segments are not down. The root blocker keeps the port in forwarding state that is directly connected to a neighboring node that is in a blocking state. For example, node 25 keeps port 26 in a forwarding state and blocks port 28. By blocking port 28, segment 2 is blocked from carrying data traffic (shown by the dashed line 501 in FIG. 7). This breaks the loop described above with respect to FIG. 6.

Figure 8:
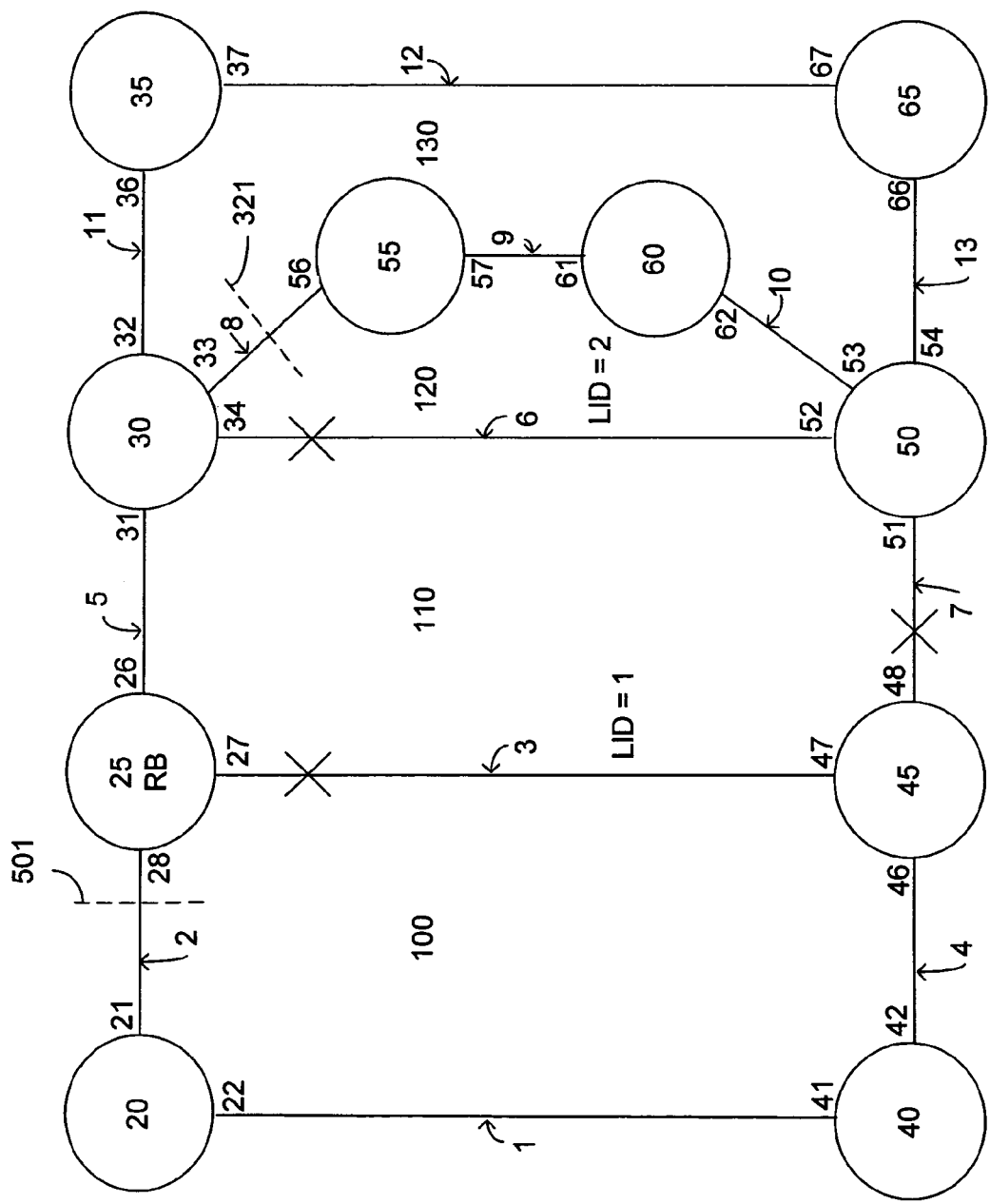
FIG. 8 illustrates an embodiment of the invention.

FIG. 8 illustrates an embodiment of the invention that resolves a disconnected network with a root blocker. In FIG. 8, segments 3 and 6 are down. This situation has been described above with respect to FIG. 7. Then, segment 7 also goes down. This causes a disconnected network, since EAPS domain 100 can no longer communicate with EAPS domain 130.

To solve this problem, the root blocker sends out periodic path detect messages across the EAPS domains. The time period between sending each message is configurable. For example, when node 25 becomes the root blocker, it may send out a path detect message once a second. If the path detect message comes back to the root blocker, then there is a valid path around the network and the network has full connectivity. If the path detect message does not come back to the root blocker in a configurable period of time, for example, in three seconds, then a timer expires, indicating that there is a disconnect in the network. This causes the root blocker to go into an inactive state and unblock a previously blocked port.

For example, when segment 7 goes down, there is a disconnect in the network. Therefore, a path detect message sent out by node 25 will not come back to node 25. This indicates to node 25 that there is a disconnect in the network, so node 25 goes into an inactive state. Node 25 will then unblock port 28, which had been blocked when node 25 became the root blocker. By unblocking port 28, segment 2 will carry data traffic and there will be full connectivity in the network.

Figure 9:
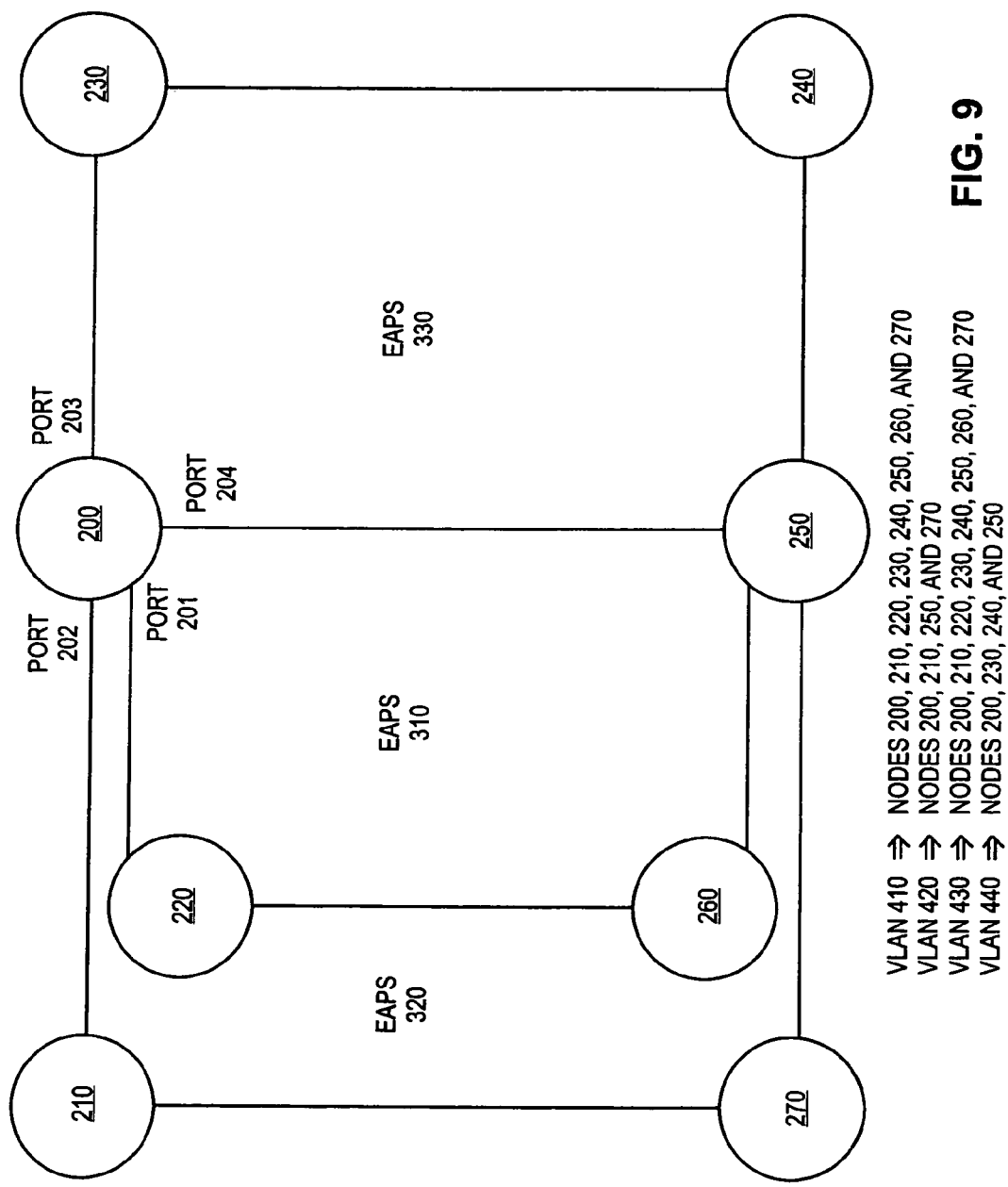
FIG. 9 illustrates an exemplary network topology.

FIG. 9 illustrates an exemplary network topology. In this example, there are four VLANs: 410, 420, 430, and 440. VLANs 410 and 430 contain nodes 200, 210, 220, 230, 240, 250, 260, and 270. VLAN 420 contains nodes 200, 210, 250, and 270. VLAN 440 contains nodes 200, 230, 240, and 250. There are three EAPS domains: 310, 320, and 330. EAPS domain 310 protects VLANs 410 and 430, and has its own control VLAN. EAPS domain 320 protects VLANs 410, 420, and 430. EAPS domain 330 protects VLANs 410, 430, and 440. Just as with EAPS domain 310, EAPS domains 320 and 330 each have respective control VLANs With reference to FIG. 9, an embodiment of the invention resolves unwanted loops in data VLANs spanning multiple rings as a result of failure of a segment shared by rings in different EAPS domains. For example, node 200 is directly connected to one end of a shared segment and is configured as a controller node, while node 250 directly connected to the other end of the shared segment is configured as a partner node. Node 200, as a controller node, is responsible for transitioning ports to a blocking state when there is a failure in the shared segment.

Figure 10:
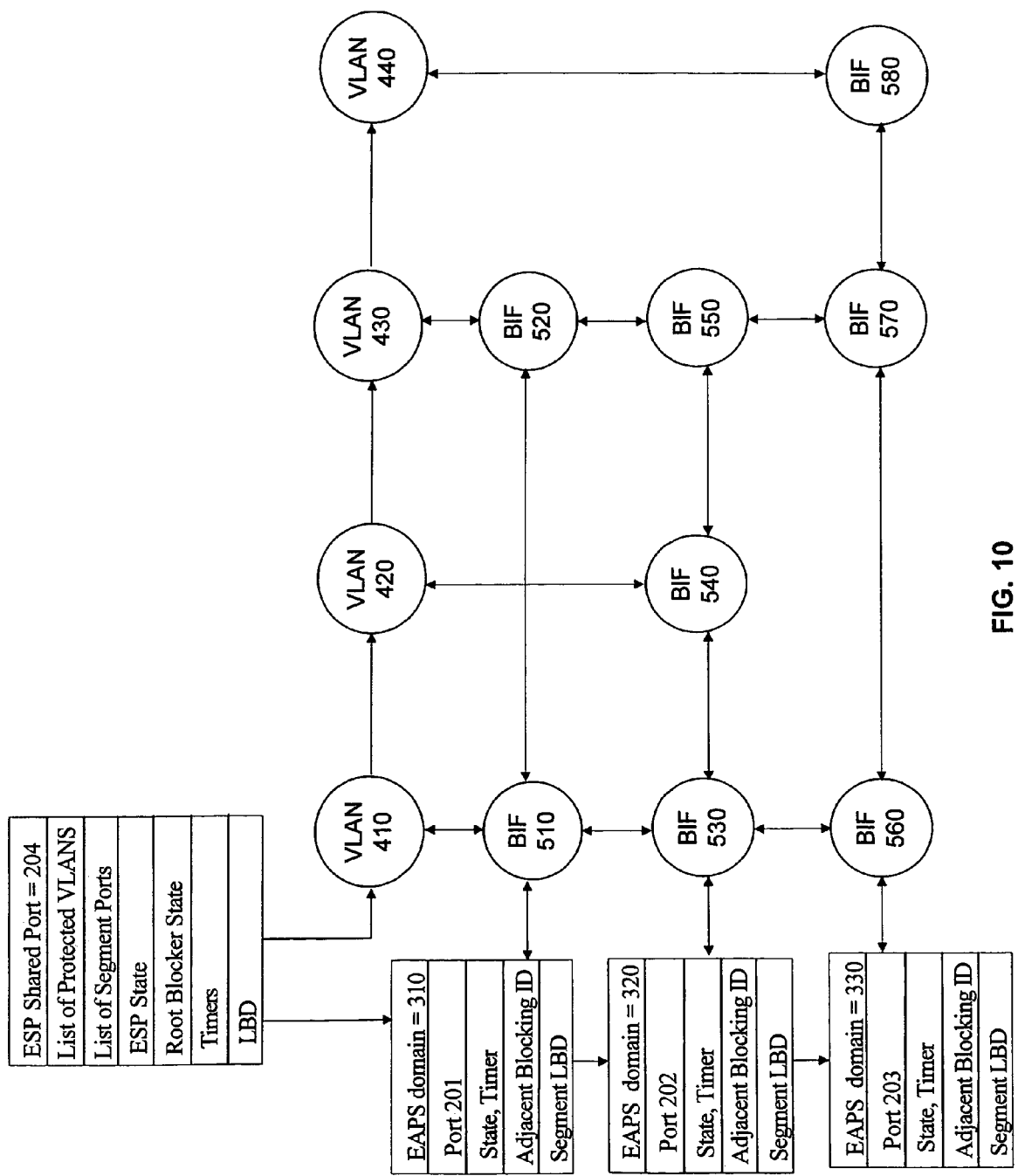
FIG. 10 illustrates a data structure according to an embodiment of the invention.

FIG. 10 illustrates data structures at node 200 according to an embodiment of the invention. At node 200, the shared port is port 204, which is the primary port for all three EAPS domains. Port 201 is the secondary port for EAPS domain 310, port 202 is the secondary port for EAPS domain 320, and port 203 is the secondary port for EAPS domain 330. Each of the plurality of bridge interfaces (BIFs) 510-580 logically represent one of the VLANs 410-440 at one of the ports 201-203.

A plurality of linked lists link the plurality of VLANs and BIFs. For example, a unidirectional linked list links VLANs 410-440. At the head of this linked list, there is a data structure with various information relating to node 200. This information may include identification of the port shared by the EAPS domains, a list of the VLANs protected by EAPS, a list of the segment ports, the EAPS shared ports (ESP) state, the root blocker state, the timers, and the least blocking domain (LBD). In this example, the shared port is port 204. The segment ports are the other ports at node 200 that connect to EAPS domains, which include ports 201, 202, and 203. The VLANs protected by EAPS at node 200 are VLANs 410, 420, 430, and 440. If node 200 is a controller node, the ESP state is one of the following: idle, ready, blocking, or pre-forwarding. If node 200 is a partner node, the ESP state is one of the following: idle, ready, or blocking. The root blocker state is one of the following: false, active, or inactive. A false root blocker state indicates that node 200 is not a root blocker. An active root blocker state indicates that node 200 is a root blocker and is currently blocking a link to prevent a loop. An inactive root blocker state indicates that node 200 is a root blocker, but is not actively blocking the loop link since it has received an indication from a path detect message that unblocking the link is needed to maintain connectivity in the network. The LBD is the link ID of the root blocker, which may be the smallest link ID among all blocking nodes in the network.

The BIFs associated with the same segment port are linked by a bi-directional linked list. At the head of this list is a data structure with various information relating to each EAPS domain. This information may include identification of the EAPS domain and the segment port, the state, the timer, the adjacent blocking ID, and the segment LBD. The state is one of the following: segment up, segment down, blocking with the segment up, and blocking with the segment down. The adjacent blocking ID is the link ID of a neighboring node that is currently in a blocking state. The segment LBD is the least blocking domain in the network that has been learned in this segment so far, which may be the smallest link ID that has been learned so far.

A bi-directional list also links a VLAN with the BIFs associated with the VLAN. In addition to having pointers to a VLAN, an EAPS domain data structure, and other BIFs, each BIF also contains other data, which includes a state. This state is one of the following: active open, open, blocked, or down. The state of the BIFs may be set by traversing the linked lists and obtaining data relating to the port and the segment. For example, to check the status of the ports and segments associated with VLAN 430, the list linking the BIFs associated with VLAN 430 may be traversed in the downward direction. First, BIF 520 is checked. The pointer from BIF 520 to the data structure for EAPS 310 is followed to obtain information about the state of the segment. If the segment is up, then port 201 may be chosen as the active open port and the state of BIF 520 is set to active open. Then, the next BIF on the list, BIF 550, is checked. The pointer from BIF 550 to the data structure for EAPS 320 is followed to obtain information about the state of the segment. If the segment is up, then port 202 is blocked and the state of BIF 550 is set to blocked. If the segment is down, then BIF 550 is set to an open state. Then, the next BIF on the list, BIF 570, is checked and the state is set in the same manner.

Figure 11:
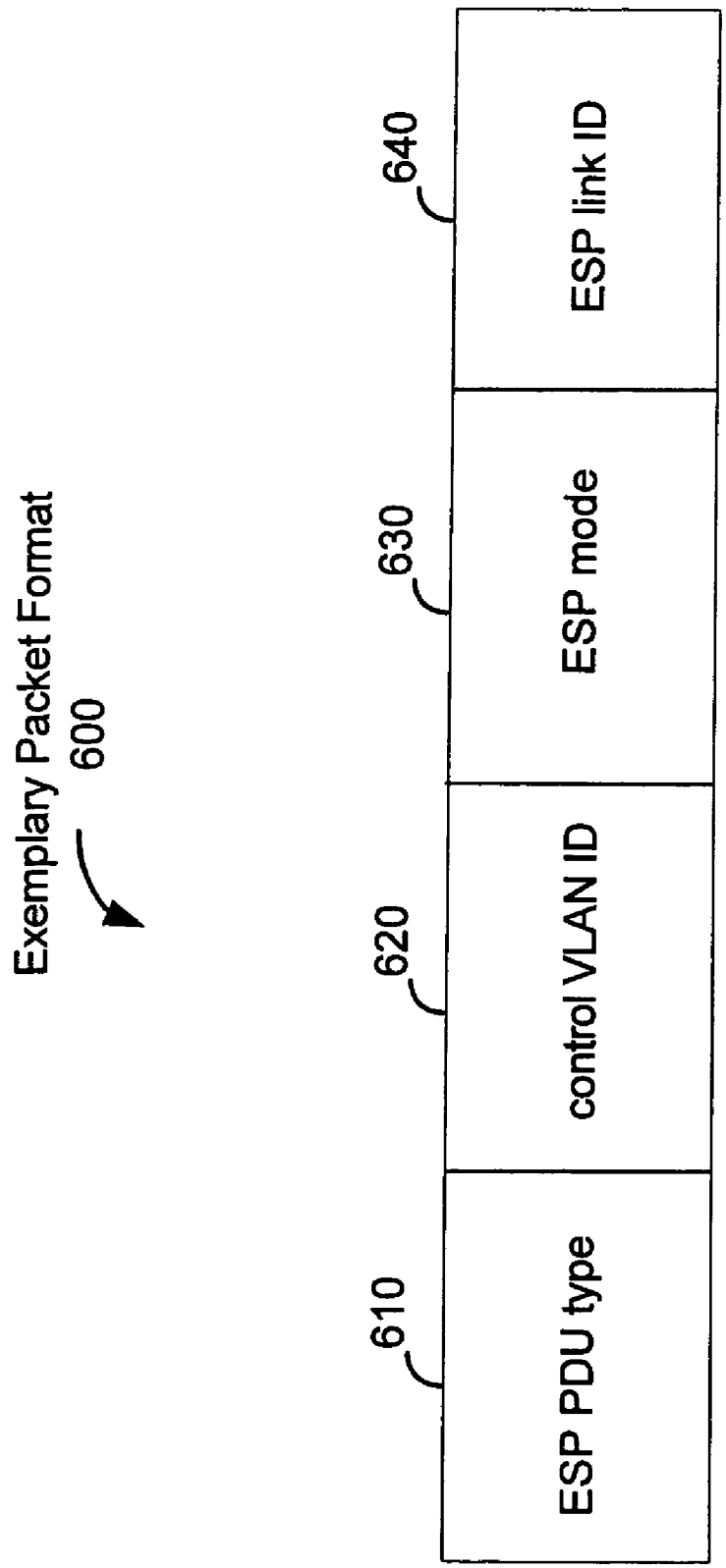
FIG. 11 illustrates an exemplary packet format according to an embodiment of the invention.

FIG. 11 illustrates an exemplary packet format 600 according to an embodiment of the invention. As shown, a control packet with an Ethernet header has various fields, including an ESP PDU type 610, a control VLAN ID 620, an ESP mode 630, and an ESP link ID 640. The ESP PDU type 610 defines the type of control message that is being sent between various nodes. Types of control messages may include a segment health check message, a path detect message, or a flush notify message. A segment health check message is sent between nodes within a single EAPS domain periodically to determine the status of the segment and to convey other pertinent information, such as the state of the sending node. A path detect message is used by the root blocker to determine whether it has connectivity to the entire network. A flush notify message is sent by a controller node to flush the entire network. The path detect and flush notify messages are inter-EAPS domain messages and follow similar paths.

The control VLAN ID 620 identifies which VLAN is the control VLAN. The ESP mode indicates whether the node is a controller node or a partner node. The ESP link ID identifies the link ID associated with the node. Various other fields may be included in the control packet header. For example, if the ESP PDU type 610 is a segment health check, there may be an additional field for an ESP state. The ESP state is one of the following: idle, ready, blocking, or pre-forwarding. A blocking ID field may be included to check network status and indicates the link ID of a node that is in blocking state. A LBD field may be included to indicate the lowest blocking domain that has been learned so far, which may be the lowest link ID that has been learned so far. Other fields, such as a system MAC address field, may also be included to provide pertinent information.

Figure 12:
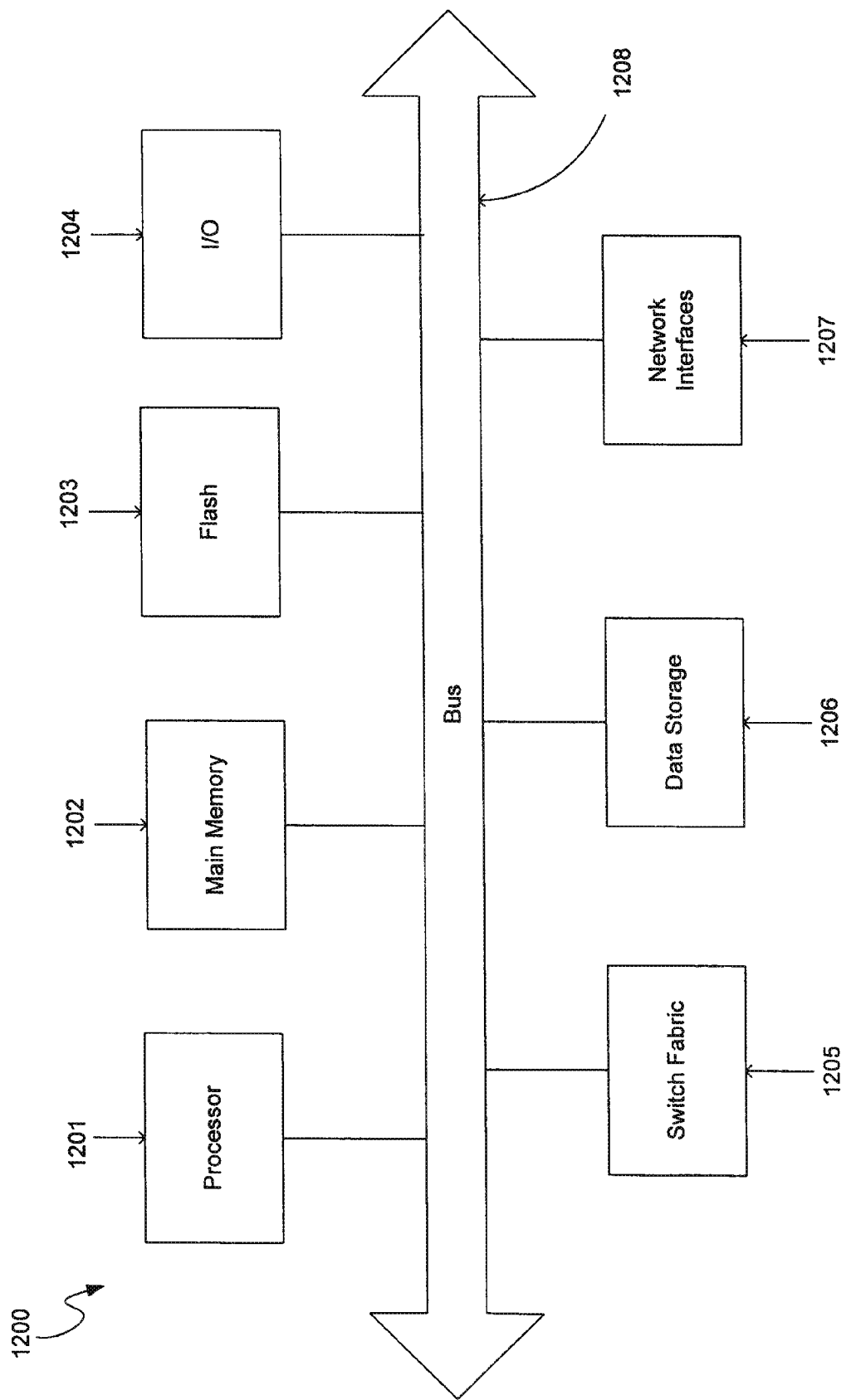
FIG. 12 illustrates one embodiment of a suitable computing environment in which certain aspects of the invention may be practiced.

FIG. 12 illustrates one embodiment of a suitable computing environment in which certain aspects of the invention may be practiced. Any of the nodes described above may be implemented on a computer system 1200. Components 1201-1208 of computer system 1200 perform their conventional functions known in the art and provide the means for implementing the EAPS system described herein. Collectively, these components are intended to represent a broad category of hardware systems, ranging from but not limited to general purpose computer systems to highly specialized network switches.

Computer system 1200 includes processor 1201, I/O devices 1204, main memory 1202 and flash memory 1203 coupled to each other via a bus 1208. Main memory 1202, which can include one or more of system memory (RAM), and nonvolatile storage devices (e.g., magnetic or optical disks), stores instructions and data for use by processor 1201. Additionally, the network interfaces 1207, data storage 1206, and switch fabric 1205 are coupled to each other via a bus 1208. Data storage 1206 represents the state registers and forwarding databases of the master nodes and transit nodes, as well as other storage areas such as packet buffers, etc., used by the switch fabric 1205 for forwarding network packets or messages. The network interfaces 1207 may include the primary port and the secondary port of the master node, as well as the ring ports of the transit nodes, of the EAPS system.

It is to be appreciated that various components of computer system 1200 may be rearranged, and that certain implementations of the present invention may not require nor include all of the above components. Furthermore, additional components may be included in system 1200, such as additional processors (e.g., a digital signal processor), storage devices, memories, network/communication interfaces, etc.

The invention may be implemented as a series of a software routines run by computer system 1200. These software routines include a number or series of instructions to be executed by a processing system in a hardware system, such as processor 1201. Initially, the series of instructions are stored on a data storage device 1206, memory 1202 or flash 1203. It is to be appreciated that the series of instructions can be stored using any conventional computer-readable or machine-accessible storage medium, such as a diskette, CD-ROM, magnetic tape, DVD, ROM, etc. It is also to be appreciated that the series of instructions need not be stored locally, and could be stored on a remote storage device, such as a server on a network, coupled via a network/communication interface 1207. The instructions are copied from the storage device 1206, such as mass storage, into a memory 1202 and then accessed and executed by processor 1201.

In alternate embodiments, the present invention is implemented in discrete hardware or firmware. For example, one or more application specific integrated circuits (ASICs) could be programmed with the above-described functions of the present invention.

Accordingly, a method and apparatus is described in which an Ethernet automatic protection switching system prevents loops in a multiple ring network. From the foregoing description, those skilled in the art will recognize that many other variations of the invention are possible. In particular, while the invention has been described as being implemented in a metropolitan area network comprising multiple nodes or switches, it should be noted that some of the logic described herein may be distributed in other components of a network or implemented in a network of different scope such as a local area network without departing from the scope of the invention.

In the above description, various aspects of the invention were described. However, it will be understood by those skilled in the art that the invention may be practiced with only some or all aspects of the invention as described. For purposes of explanation, specific numbers, materials and configurations are set forth in order to provide a thorough understanding of the invention. However, it will also be apparent to those skilled in the art that the invention may be practiced without these specific details.

Parts of the description is presented in terms of operations performed by a computer system, using terms such as data, state, link, fault, packet, and the like, consistent with the manner commonly employed by those skilled in the art to convey the substance of their work to others skilled in the art.

As is well understood by those skilled in the art, these quantities are capable of being stored and combined, in the computer system; and the term computer system includes general purpose as well as special purpose data processing machines, routers, bridges, switches, and the like, that are standalone, adjunct or embedded.

Additionally, various operations are described as multiple discrete steps in turn in a manner that is helpful in understanding the invention. However, the order of description should not be construed as to imply that these operations are necessarily order dependent, in particular, the order of their presentation.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Thus, the invention is not limited by the details described. Instead, the invention can be practiced with modifications and alterations within the spirit and scope of the claims that follow.

The invention claimed is:

1. A method for preventing a loop in a virtual network, comprising:

detecting a failure to transmit data in a first of two or more shared segments, the first shared segment shared by a first and a second physical network ring implemented on the virtual network;

determining whether a second of the two or more shared segments transmits data, the second shared segment shared by the first physical network ring and a third physical network ring implemented on the virtual network, the virtual network comprising a plurality of domains wherein each physical network ring is protected by a corresponding automatic protection switching system;

changing, by a processor, to a state of blocking data traffic, all but one of a number of ports of a node directly coupled to the first shared segment in response to detecting the failure in the first shared segment and determining the second shared segment does transmit data, wherein each of the number of ports couple the node to a non-shared segment of the first or second physical ring; and designating one node from all nodes directly coupled to either of the first and second shared segments as a root blocker node in response to detecting the failure to transmit data in the first shared segment and determining the second shared segment also fails to transmit data, the root blocker node having one or more non-shared segments directly coupled thereto, and changing, to a state of blocking data traffic, all but one of a number of root blocker ports, wherein each of the number of root blocker ports couple the root blocker node to a non-shared segment of the first or third physical ring.

2. The method of claim 1 further comprising:

transmitting from the root blocker node, a path detect signal through the plurality of domains; and allowing the transmission of data traffic from the root blocker node if the path detect message does not traverse the plurality of domains and arrive at the root blocker node.

3. The method of claim 2 wherein the path detect signal is transmitted periodically.

4. The method of claim 3 wherein the path detect signal is transmitted at intervals of approximately 1 second and a specified time is approximately 3 seconds.

5. The method of claim 1 wherein the designating one node from all nodes directly coupled to either of the first and second shared segments as a root blocker node further comprises:

evaluating a node link identifier of each node directly coupled to one of the two or more shared segments; and designating a node as the root blocker node based upon the evaluation.

6. The method of claim 5 wherein the evaluating the node link identifier includes determining the lowest link identifier and designating that node as the root blocker node.

7. The method of claim 1, wherein each of the nodes is a switch.

8. The method of claim 7, wherein each switch is operable at least to bridge data traffic between the rings.

9. The method of claim 8 wherein each switch is operable at least to bridge data traffic between the rings in accordance with the Institute for Electronic and Electrical Engineers (IEEE) standard.

10. The method of claim 1, wherein the preventing a loop in a virtual network comprises preventing a logical loop in the virtual network.

11. The method claim 1, wherein each of the first and second shared segments comprises at least two physical segments coupled by another node.

12. The method of claim 1, wherein each of the detecting a failure in the first shared segment to transmit data and the determining the second shared segment also fails to transmit data comprises one of: failing to receive at least one message indicating the shared segment is operating and receiving at least one message indicating the shared segment is not operating.

13. The method of claim 1, wherein the changing to a state of blocking data traffic all but one of a number of root blocker ports further comprises keeping a port in a forward state that is directly connected to a neighboring node that that has a port in a blocking state.

14. A computer readable storage medium storing computer executable instructions to be executed by a processor for preventing a loop in a virtual network, comprising:

detecting a failure to transmit data in a first of two or more shared segments, the first shared segment shared by a first and a second physical network ring implemented on a the virtual network;

determining whether a second of the two or more shared segments transmits data, the second shared segment shared by the first physical network ring and a third physical network ring implemented on the virtual network, the virtual network comprising a plurality of domains wherein each physical network ring is protected by a corresponding automatic protection switching system;

changing to a state of blocking data traffic, all but one of a number of ports of a node directly coupled to the first shared segment in response to detecting the failure to transmit data in the first shared segment and determining the second shared segment does transmit data, wherein each of the number of ports couple the node to a non-shared segment of the first or second physical ring; and designating one node from all nodes directly coupled to either of the first and second shared segments as a root blocker node in response to detecting the failure in the first shared segment and determining the second shared segment also fails to transmit data, the root blocker node having one or more non-shared segments directly coupled thereto, and changing, to a state of blocking traffic, all but one of a number of root blocker ports, wherein each of the number of root blocker ports couple the root blocker node to a non-shared segment of the first or third physical ring.

15. The computer readable medium of claim 14 wherein the method further comprises:
   transmitting from the root blocker node, a path detect signal through the plurality of domains; and
   allowing the transmission of data traffic from the root blocker node if the path detect message does not traverse the plurality of domains and arrive at the root blocker node.

16. The computer readable medium of claim 15 wherein the path detect signal is transmitted periodically.

17. The computer readable medium of claim 16 wherein the path detect signal is transmitted at intervals of approximately 1 second and a specified time is approximately 3 seconds.

18. The computer readable medium of claim 14 wherein the designating one node from all nodes directly coupled to either of the first and second shared segments as a root blocker node further comprises:
   evaluating a node link identifier of each node directly coupled to one of the two or more shared segments; and
   designating a node as the root blocker node based upon the evaluation.

19. The computer readable medium of claim 18 wherein the evaluating the node link identifier includes determining the lowest link identifier and designating that node as the root blocker node.

20. The computer readable medium of claim 14, wherein each of the nodes is a switch.

21. The computer readable medium of claim 20, wherein each switch is operable at least to bridge data traffic between the rings.

22. The computer readable medium of claim 21 wherein each switch is operable at least to bridge data traffic between the rings in accordance with the Institute for Electronic and Electrical Engineers (IEEE) standard.

23. The computer readable medium of claim 14, wherein the preventing a loop in a virtual network comprises preventing a logical loop in the virtual network.

24. The computer readable medium of claim 14, wherein each of the first and second shared segments comprises at least two physical segments coupled by another node.

25. The computer readable medium of claim 14, wherein each of the detecting a failure in the first shared segment to transmit data and the determining the second shared segment also fails to transmit data comprises one of: failing to receive at least one message indicating the shared segment is operating; and receiving at least one message indicating the shared segment is not operating.

* * * * *

UNITED STATES PATENT AND TRADEMARK OFFICE
CERTIFICATE OF CORRECTION

PATENT NO.        : 7,606,240 B1                                    Page 1 of 1
APPLICATION NO. : 11/155526
DATED             : October 20, 2009
INVENTOR(S)       : Sunil P. Shah It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Fifth Day of October, 2010

David J. Kappos
*Director of the United States Patent and Trademark Office*